United States Patent
Florence et al.

[11] Patent Number: 6,038,056
[45] Date of Patent: Mar. 14, 2000

[54] SPATIAL LIGHT MODULATOR HAVING IMPROVED CONTRAST RATIO

[75] Inventors: James M. Florence; James D. Huffman, both of Richardson; Rodney D. Miller, Frisco, all of Tex.

[73] Assignee: Texas Instruments Incorporated, Dallas, Tex.

[21] Appl. No.: 09/354,838

[22] Filed: Jul. 16, 1999

Related U.S. Application Data

[62] Division of application No. 09/073,329, May 6, 1998, Pat. No. 5,943,157.
[60] Provisional application No. 60/045,986, May 8, 1997.

[51] Int. Cl.[7] .................................................. G02B 26/00

[52] U.S. Cl. .......................... 359/290; 359/224; 359/226; 359/850

[58] Field of Search ...................................... 359/290, 291, 359/295, 223, 224, 226, 846, 850

[56] References Cited

U.S. PATENT DOCUMENTS

| | | | |
|---|---|---|---|
| 5,061,049 | 10/1991 | Hornbeck | 359/224 |
| 5,142,405 | 8/1992 | Hornbeck | 359/226 |
| 5,535,047 | 7/1996 | Hornbeck | 359/295 |
| 5,583,688 | 12/1996 | Hornbeck | 359/291 |
| 5,661,591 | 8/1997 | Lin et al. | 359/290 |
| 5,771,116 | 6/1998 | Miller et al. | 359/295 |
| 5,943,157 | 8/1999 | Florence et al. | 359/290 |
| 5,953,153 | 9/1999 | Conner et al. | 359/290 |

*Primary Examiner*—Loha Ben
*Attorney, Agent, or Firm*—Charles A. Brill; Frederick J. Telecky, Jr.; Richard L. Donaldson

[57] ABSTRACT

A spatial light modulator (70) comprised of an array of micromirrors (72) each having support post (74). The support post (74) defines support post edges (76) in the upper surface of the mirrors (72). These support post edges (76) are all oriented at 45 degree angles with respect to an incident beam of light from a light source (80) to minimize diffraction of light from the edges (76) into the darkfield optics when the mirrors are oriented in the off-state. The present invention achieves an increased contrast ratio of about 20% over conventional designs.

11 Claims, 4 Drawing Sheets

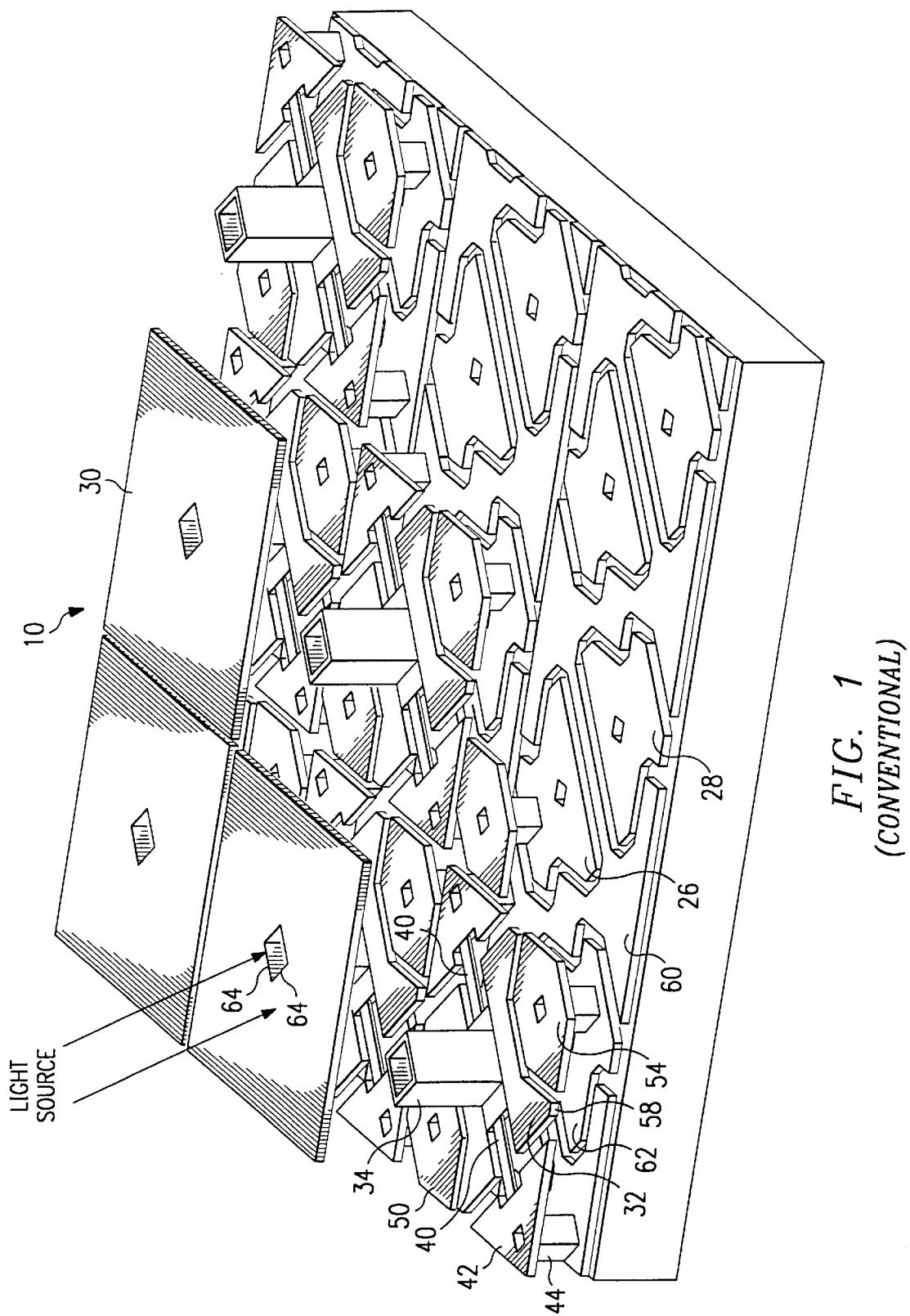
FIG. 1
(CONVENTIONAL)

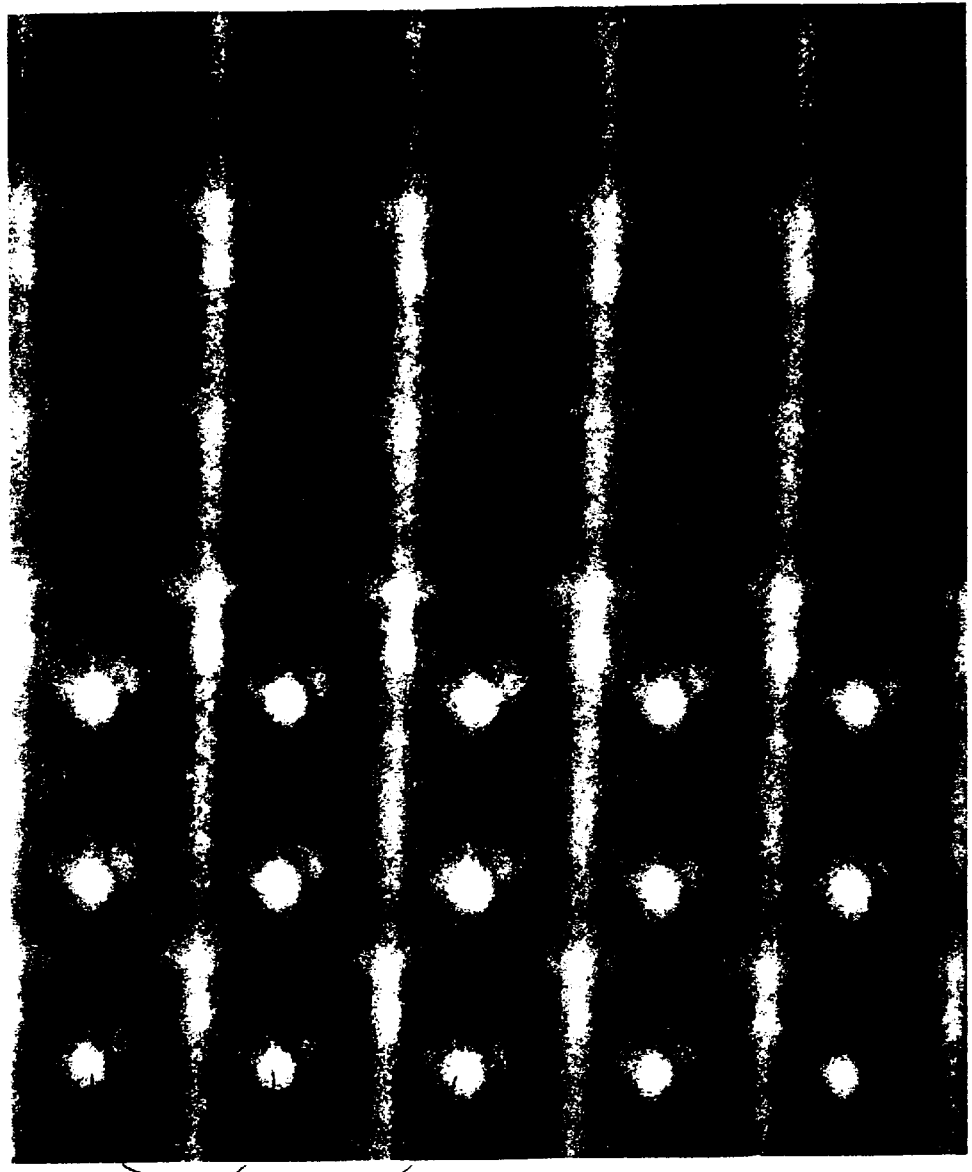
FIG. 2
(CONVENTIONAL)

SPATIAL LIGHT MODULATOR HAVING IMPROVED CONTRAST RATIO

This application is a divisional of application Ser. No. 09/073,329 filed May 6, 1998, now U.S. Pat. No. 5,943,157, which claims priority from application Ser. No. 60/045,986 filed May 8, 1997.

FIELD OF THE INVENTION

The present invention is generally related to spatial light modulators for modulating incident light to form an optical light image, and more particularity, to a digital micromirror device (DMD) having an array of bistable micromirrors fabricated over addressing circuitry.

BACKGROUND OF THE INVENTION

Spatial Light Modulators (SLMs) have found numerous applications in the areas of optical information processing, projection displays, video and graphics monitors, televisions, and electrophotographic printing. SLMs are devices that modulate incident light in a spatial pattern to form a light image corresponding to an electrical or optical input. The incident light may be modulated in its phase, intensity, polarization, or direction. The light modulation may be achieved by a variety of materials exhibiting various electro-optic or magneto-optic effects, and by materials that modulate light by surface deformation.

A SLM is typically comprised of an area or linear array of addressable picture elements (pixels). Source pixel data is first formatted by an associated control circuit, usually external to the SLM, and then loaded into the pixel array one frame at a time. This pixel data may be written to the pixel array using a variety of algorithms, i.e. sequentially top-to-bottom one pixel line at a time, interleaving by sequentially addressing top-to-bottom every other pixel line, such as the odd rows of pixels, and then returning to address the even pixel lines, etc. In cathode ray tubes (CRTs), this data writing technique is known as rasterizing, whereby a high powered electron gun scans across the pixel elements of a phosphor screen left to right, one line at a time. This pixel address data writing scheme is equally applicable to liquid crystal displays (LCDs) as well.

A recent innovation of Texas Instruments Incorporated of Dallas Tex., is the digital micromirror device or the deformable mirror device (collectively DMD). The DMD is revolutionary in that it is truly a digital display device and an integrated circuit solution. The DMD is an electro/mechanical/optical SLM suitable for use in displays, projectors and hardcopy printers. The DMD is a monolithic single-chip integrated circuit SLM, comprised of a high density array of 16 micron square movable micromirrors on 17 micron centers. These mirrors are fabricated over address circuitry including an array of SRAM cells and address electrodes. Each mirror forms one pixel of the DMD array and is bistable, that is to say, stable in one of two positions, wherein a source of light directed upon the mirror array will be reflected in one of two directions. In one stable "on" mirror position, incident light to that mirror will be reflected to a projector lens and focused on a display screen or a photosensitive element of a printer. In the other "off" mirror position, light directed on the mirror will be deflected to a light absorber. Each mirror of the array is individually controlled to either direct incident light into the projector lens, or to the light absorber. The projector lens ultimately focuses and magnifies the modulated light from the pixel mirrors onto a display screen and produce an image in the case of a display. If each pixel mirror of the DMD array is in the "on" position, the displayed image will be an array of bright pixels.

For a more detailed discussion of the DMD device and uses, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the image is achieved by pulse-width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of which are incorporated herein by reference.

As detailed in commonly assigned U.S. Pat. No. 5,535,047 entitled "Active Yoke Hidden Hinge Digital Micromirror Device", and shown in FIG. 1 of the present application, there is disclosed a digital micromirror device (DMD) spatial light modulator shown at 10. DMD 10 is a single-chip integrated circuit seen to include an array of micromirrors 30 monolithically fabricated over a memory cell array formed upon the substrate. Each pixel mirror 30 is seen to include a square mirror supported upon and elevated above a butterfly shaped yoke generally shown at 32 by a rectangular support post 34. Support post 34 extends downward from the center of the mirror 30, and is attached to the center of the yoke 32 along a torsion axis thereof, as shown, to balance the center of mass of mirror 30 upon yoke 32. Yoke 32 is axially supported along a central axis thereof by a pair of torsion hinges 40. The other end of each torsion hinge 40 is attached to and supported by a hinge support post cap 42 defined on top of a respective hinge support post 44. A pair of elevated mirror address electrodes 50 and 54 are supported by a respective address support post. The address support posts, and the hinge support posts 44, support the address electrodes 50 and 54, the torsion hinges 40, and the yoke 32 away from and above a bias/reset bus 60, and a pair of substrate level address electrode pads 26 and 28. When mirror 30 and yoke 32 are together rotated about the torsion axis of the yoke, defined by the hinges 40, a pair of yoke tips 58 on the side of the yoke 32 that is deflected land upon and engage the bias/reset bus 60 at a landing site 62. For more detailed discussion of this conventional DMD, the teachings of commonly assigned U.S. Pat. No. 5,535,047 are incorporated herein by reference.

Still referring to FIG. 1, it can be seen that the support post 34 extends downward from the reflective modulation surface of the square mirror 30 and defines support post edges at 64. These support post edges 64 conventionally have dimensions of 3×4 $\mu$m, which edges form a rectangle and are oriented either perpendicular or parallel to the incoming beam of light. Referring to FIG. 2, there is shown the light diffracted back into the projection optics when all mirrors are in the off-state. It can be seen that these support post edges 64 diffract the incident light into the projection system optics when the mirrors 30 are tilted to the off state, the diffraction seen as light dots 66, thus reducing the contrast ratio of the formed display image. Also seen in FIG. 2 is diffracted light from the underlying superstructure and address circuitry from between the mirror edges.

There is desired a DMD spatial light modulator forming an image having an improved contrast ratio whereby the diffraction of incident light from the support post edges 64 into the projection optics is substantially reduced.

SUMMARY OF THE INVENTION

The present invention achieves technical advantages as a micromechanical spatial light modulator by orienting the support post edges to be parallel to the mirror edges, and orienting the mirror edges at 45 degrees with respect to incident light. In addition, the dimensions of the support post edges are substantially reduced from 3×4 µm to 2.4×2.4 µm. This design substantially reduces the amount of scattered light from the support post edges back into the darkfield projection system optics. The corners formed by support post edges diffract a minimal amount of light back into the projection optics in this orientation. The support post edges are parallel with the corresponding mirror edges, and are also oriented at 45 degrees with respect to the incident light to minimize light diffraction therefrom.

BRIEF DESCRIPTION OF THE DRAWINGS

FIG. 1 is a section view of a 3×3 array of pixels of a conventional DMD array with the yokes elevated address electrodes, and some hinge support posts being removed to illustrate underlying support structure, whereby the mirror support post edges are either perpendicular or parallel to the incident light and thus diffract incident light back into the projection optics, the dimensions of these support post edges being approximately 3×4 µm;

FIG. 2 is a pictorial view of an image formed by the array of mirrors of FIG. 1 in the off-state, whereby light is diffracted from the support post edges back into the projection optics, shown as light dots, thereby reducing the contrast ratio of the image formed by the spatial light modulator;

DESCRIPTION OF THE PREFERRED EMBODIMENT

Figure 3:
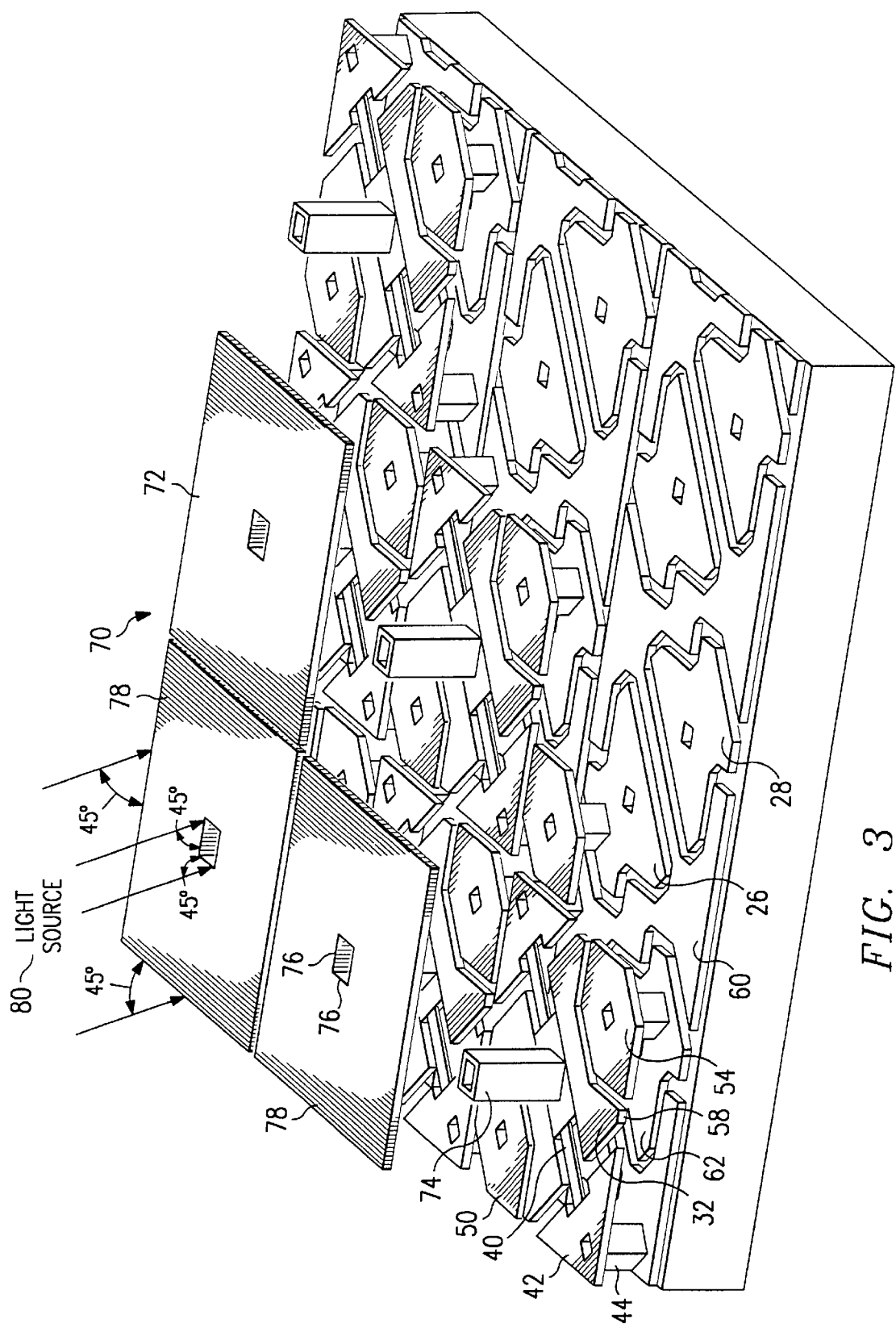
FIG. 3 is a section view of a 3×3 array of pixels according to the present invention whereby the support post edges are all oriented at 45 degrees with respect to the incident light, each edge being parallel to the corresponding mirror edges, to substantially reduce the amount of diffracted light back into the projection optics when oriented in the off-state.

Referring now to FIG. 3, there is shown at 70 an improved spatial light modulator according to the preferred embodiment of the present invention, wherein like numerals refer to like elements. Spatial light modulator 70 is preferably a digital micromirror device (DMD), however, other micromechanical spatial light modulators are intended to be covered by the present invention as well.

DMD 70 is improved over the conventional design shown in FIG. 1 by providing each mirror 72 with a mirror support post 74 defining support post edges 76 that are all oriented at 45 degrees with respect to the incident beam of light generated by light source 80. Each edge 76 is parallel to the corresponding mirror edges 78 of the respective mirrors 72, and thus edges 78 are also oriented at 45 degrees with respect to the incident beam of light generated by light source 80. This orientation of support post edges 76 with respect to the incident light beam minimizes any diffraction of light from being scattered back into the darkfield projection system optics when the mirror surfaces are oriented in the off-state. This is important to increase the contrast ratio of the display formed by SLM 70. For darkfield optics systems, it is imperative that as little light as possible be diffracted back into the optics when the mirrors 72 are in the off-state. By orienting the support post edges 76 to extend at 45 degrees with respect to the incident beam of light, this diffraction of light is minimized, and the generation of light dots 66 diffracted by the mirrors in the off-state into the projection optics, as seen in FIG. 2, are substantially reduced. Any diffraction of light from the corners defined by the edges 76 into the projection optics is also substantially reduced.

According to the present invention, the dimensions of the support post edges 76 have been substantially reduced from that of conventional designs. Specifically, the edges 76 have been reduced to a length of about 2.4×2.4 µm, which is substantially reduced from conventional dimensions shown in FIG. 1 which are typically 3×4 µm. Minimizing the length of the support post edges 76 also contributes to an improved contrast ratio of the image displayed by the spatial light modulator 70 according to the preferred embodiment of the present invention.

Figure 4:
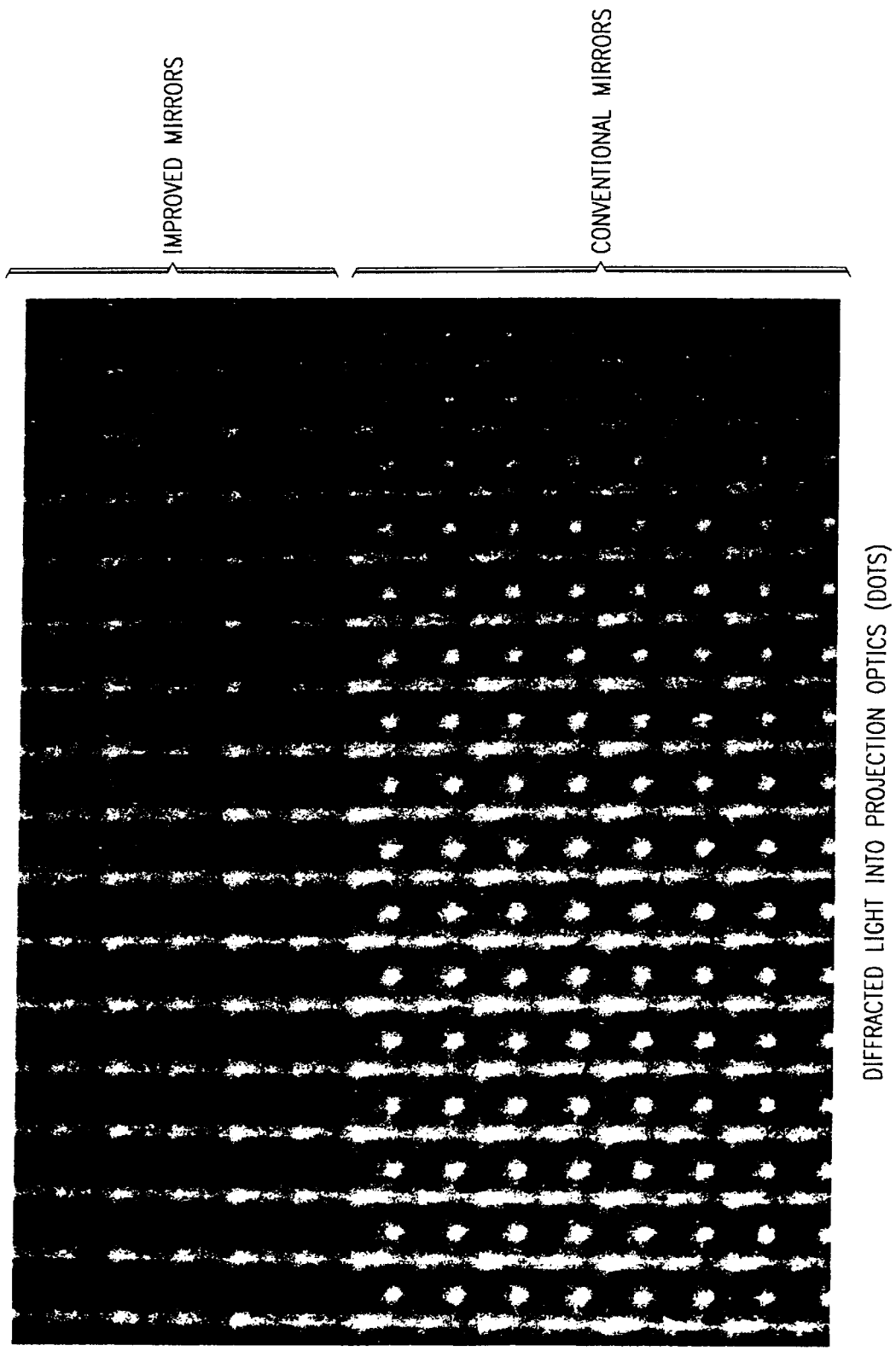
FIG. 4 is a pictorial view of the diffracted light from the support post edges of FIG. 3 in the off-state, illustrating a minimal amount of light being diffracted from the support post edges back into the projection optics, thereby significantly increasing the contrast ratio of the display image.

In previous designs, it was believed that orienting the support post edges 62, as shown in FIG. 1, to either be parallel to or perpendicular to the incoming beam of light was necessary to minimize diffraction of light from the support post corners. However, by reducing the dimensions of the support post edges 76, and orienting these edges 76 to extend at 45 degrees with respect to the incident beam of light has proven to provide an image with a substantially improved contrast ratio, as shown in FIG. 4. The amount of scattered light from the support post edges 76, and from the corners defined by these edges, is substantially reduced as compared to the conventional display shown for comparison in FIG. 4. In fact, an improved contrast ratio of about 20% is achieved over the embodiment of FIG. 1. Thus, the improvement of the present invention has dramatic results.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A spatial light modulator, comprising:
    at least one torsion hinge, said torsion hinge defining a deflection axis;
    a light modulation surface; and
    a support member supported by said torsion hinge and extending to said light modulation surface, said support member defining support edges in said light modulation surface, said support edges substantially oriented at a 45 degree angle to a projection of said deflection axis onto said light modulation surface.

2. The spatial light modulator as specified in claim 1, said light modulation surface comprising surface edges, wherein said surface edges and said support edges both define a rectangle.

3. The spatial light modulator as specified in claim 1 wherein said support member is centrally located with respect to said light modulation surface.

4. The spatial light modulator as specified in claim 3 wherein said support member extends perpendicular from said light modulation surface.

5. The spatial light modulator as specified in claim 1 further comprising a light source generating light beam incident to said light modulation surface, said light beam having a path projected onto said light modulation surface, said surface edges and said support edges both extending 45 degrees with respect to said path.

6. The spatial light modulator as specified in claim 1 wherein said support edges define an area no greater than 5.76 mm$^2$.

7. A display system, comprising:
- a light source generating a light beam;
- at least one torsion hinge, said torsion hinge defining a deflection axis;
- a light modulation surface; and
- a support member supported by said torsion hinge and extending to said light modulation surface, said support member defining support edges in said light modulation surface, said support edges substantially oriented at a 45 degree angle to a projection of said deflection axis onto said light modulation surface.

8. The spatial light modulator as specified in claim 7, said light modulation surface comprising surface edges, wherein said surface edges and said support edges both define a rectangle.

9. The spatial light modulator as specified in claim 7 wherein said support member is centrally located with respect to said light modulation surface.

10. The spatial light modulator as specified in claim 7 wherein said support member extends perpendicular from said light modulation surface.

11. The spatial light modulator as specified in claim 7 wherein said support edges define an area no greater than 5.76 mm$^2$.

* * * * *